US012246725B2

(12) United States Patent
Urazoe et al.

(10) Patent No.: US 12,246,725 B2
(45) Date of Patent: Mar. 11, 2025

(54) ATTITUDE ESTIMATION SYSTEM, CONTROL SYSTEM, AND ATTITUDE ESTIMATION METHOD

(71) Applicant: Panasonic Intellectual Property Management Co., Ltd., Osaka (JP)

(72) Inventors: Kazuya Urazoe, Osaka (JP); Hirohito Mukai, Tokyo (JP); Jun Imamura, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 166 days.

(21) Appl. No.: 18/100,817

(22) Filed: Jan. 24, 2023

(65) Prior Publication Data
US 2023/0249691 A1 Aug. 10, 2023

(30) Foreign Application Priority Data
Feb. 10, 2022 (JP) .................. 2022-019861

(51) Int. Cl.
*B60W 40/076* (2012.01)
*B60W 40/105* (2012.01)
(Continued)

(52) U.S. Cl.
CPC ........ *B60W 40/076* (2013.01); *B60W 40/105* (2013.01); *B60W 40/11* (2013.01);
(Continued)

(58) Field of Classification Search
CPC .. B60W 40/076; B60W 40/105; B60W 40/11; B60W 40/13; B60W 2552/15; G01S 13/931; G01S 17/931
(Continued)

(56) References Cited

U.S. PATENT DOCUMENTS 8,135,513 B2 * 3/2012 Bauer .................. G01S 7/4972
701/523
8,724,094 B2 * 5/2014 Miyahara .............. G01S 17/931
356/9
(Continued)

FOREIGN PATENT DOCUMENTS

DE 102019106253 A1 * 9/2020
DE 102019109253 10/2020
(Continued)

OTHER PUBLICATIONS

Office Action from Japan Patent Office (JPO) in Japanese Patent Appl. No. 2022-019861, dated Apr. 9, 2024, together with an English language translation.
(Continued)

*Primary Examiner* — Phutthiwat Wongwian
*Assistant Examiner* — Brian R Kirby
(74) *Attorney, Agent, or Firm* — Greenblum & Bernstein, P.L.C.

(57) ABSTRACT

An attitude estimation system includes an obtainer, an estimator, and an outputter. The obtainer obtains a detection result of a first sensor attached to a vehicle. The estimator calculates a relative angle of a road surface on which the vehicle travels with respect to the first sensor, based on the detection result of the first sensor obtained by the obtainer, and estimates a constant deviation of the attitude of the vehicle with respect to a reference attitude of the vehicle. The outputter outputs attitude information indicating the deviation estimated by the estimator.

14 Claims, 13 Drawing Sheets

(51) Int. Cl.
  *B60W 40/11* (2012.01)
  *B60W 40/13* (2012.01)
  *G01S 13/931* (2020.01)
  *G01S 17/931* (2020.01)
(52) U.S. Cl.
  CPC .......... *G01S 13/931* (2013.01); *G01S 17/931* (2020.01); *B60W 40/13* (2013.01); *B60W 2552/15* (2020.02); *B60W 2554/4049* (2020.02)
(58) Field of Classification Search
  USPC ................................ 701/4, 38, 70, 300, 408
  See application file for complete search history.

(56) References Cited

U.S. PATENT DOCUMENTS

| | | | | |
|---|---|---|---|---|
| 8,825,260 | B1* | 9/2014 | Silver | G01S 13/931 |
| | | | | 342/159 |
| 9,880,273 | B2* | 1/2018 | Matsuura | G01S 15/04 |
| 2013/0154871 | A1* | 6/2013 | Gaboury | G01S 7/4026 |
| | | | | 342/82 |
| 2016/0003938 | A1* | 1/2016 | Gazit | G01S 13/02 |
| | | | | 342/81 |
| 2017/0043703 | A1* | 2/2017 | Mizuno | B60Q 1/115 |
| 2018/0113200 | A1* | 4/2018 | Steinberg | G02B 26/0858 |
| 2019/0161082 | A1* | 5/2019 | Fairgrieve | B60W 30/143 |
| 2020/0041650 | A1* | 2/2020 | Matsui | G01S 7/4817 |
| 2021/0216814 | A1* | 7/2021 | Li | G06V 10/763 |
| 2021/0389469 | A1* | 12/2021 | Sakata | B60W 50/14 |

FOREIGN PATENT DOCUMENTS

| | | | |
|---|---|---|---|
| JP | 2003-057345 | | 2/2003 |
| JP | 2003057345 | A * | 2/2003 |
| JP | 2010-164356 | | 7/2010 |
| JP | 2015-075382 | | 4/2015 |
| JP | 2015075382 | A * | 4/2015 |
| JP | 2015-135301 | | 7/2015 |
| JP | 2019-086402 | | 6/2019 |
| JP | 2021-103132 | | 7/2021 |

OTHER PUBLICATIONS

Office Action from Japan Patent Office (JPO) in Japanese Patent Appl. No. 2022-019861, dated Jan. 30, 2024, together with an English language translation.

* cited by examiner

FIG. 10
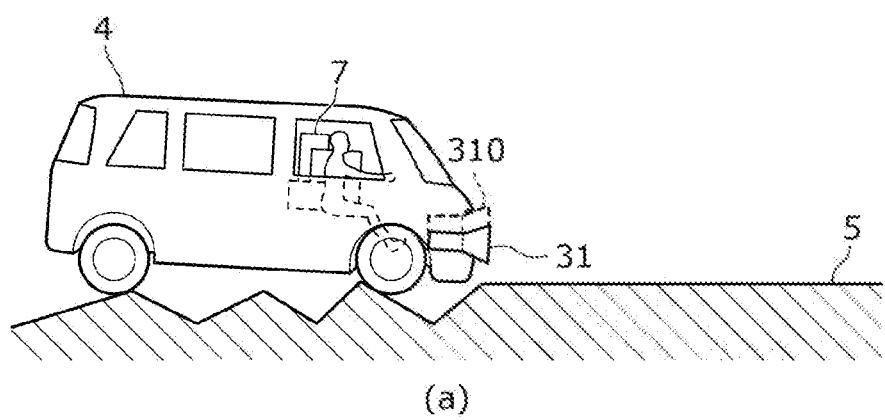
(a)
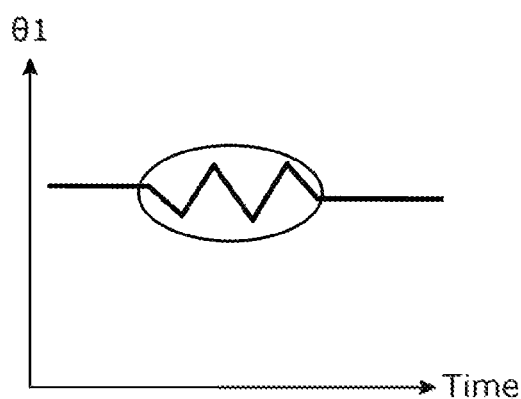
(b)

FIG. 13
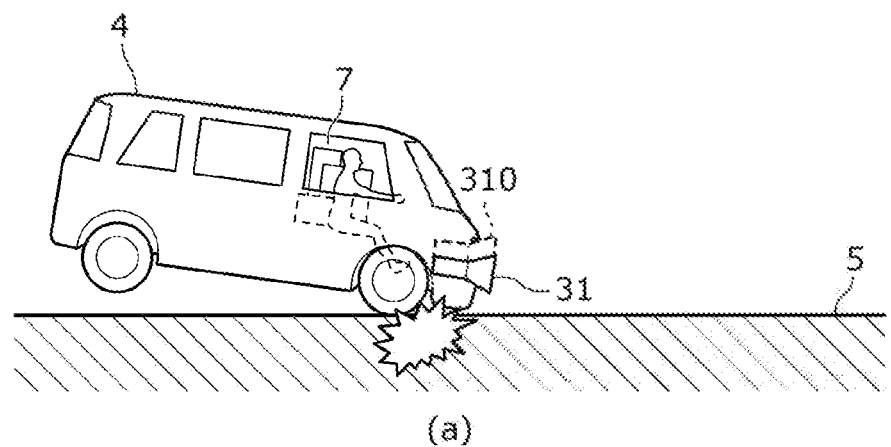
(a)
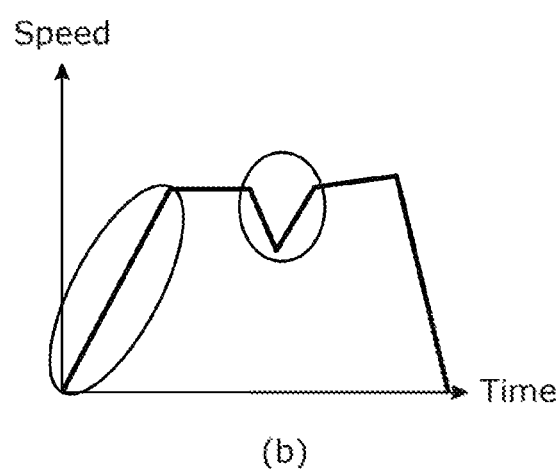
(b)

ATTITUDE ESTIMATION SYSTEM, CONTROL SYSTEM, AND ATTITUDE ESTIMATION METHOD

CROSS REFERENCE TO RELATED APPLICATION

The present application is based on and claims priority of Japanese Patent Application No. 2022-019861 filed on Feb. 10, 2022.

Field

The present disclosure generally relates to an attitude estimation system, a control system, and an attitude estimation method for estimating the attitude of a vehicle.

Background

Patent literature (PTL) 1 discloses a vehicle periphery monitoring system that is included in an automobile and detects whether an obstacle is present in the vicinity of the automobile that is running.

CITATION LIST

Patent Literature

PTL 1: Japanese Unexamined Patent Application Publication No. 2015-135301

SUMMARY

The present disclosure provides an attitude estimation system capable of improving upon the above related art.

The attitude estimation system according to an aspect of the present disclosure includes an obtainer, an estimator, and an outputter. The obtainer obtains a detection result of a first sensor attached to a vehicle. The estimator calculates a relative angle of a road surface with respect to the first sensor, based on the detection result of the first sensor obtained by the obtainer, and estimates a deviation of the vehicle, the road surface being a surface on which the vehicle travels, the deviation being a constant deviation of an attitude of the vehicle with respect to a reference attitude of the vehicle. The outputter outputs attitude information indicating the deviation estimated by the estimator.

The control system according to an aspect of the present disclosure includes an input receiver and a controller. The input receiver obtains attitude information indicating a deviation of a vehicle, the deviation being a constant deviation of an attitude of the vehicle with respect to a reference attitude of the vehicle. The controller outputs a control signal to a second sensor that detects whether an obstacle is present in vicinity of the vehicle, based on the attitude information obtained by the input receiver, the control signal being a signal indicating a threshold used by the second sensor to determine whether the obstacle is present. The controller changes the threshold in accordance with a magnitude of the deviation indicated by the attitude information.

In the attitude estimation method according to an aspect of the present disclosure, a detection result of a first sensor attached to a vehicle is obtained. In the attitude estimation method, a relative angle of a road surface with respect to the first sensor is calculated, based on the detection result of the first sensor obtained, and a deviation of the vehicle is estimated, the road surface being a surface on which the vehicle travels, the deviation being a constant deviation of an attitude of the vehicle with respect to a reference attitude of the vehicle.

The attitude estimation system and so forth of the present disclosure are capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 10 is a diagram for explaining an attitude estimation system in Variation 1 of the embodiment.

FIG. 13 is a diagram for explaining an attitude estimation system in Variation 4 of the embodiment.

DESCRIPTION OF EMBODIMENT

Figure 1:
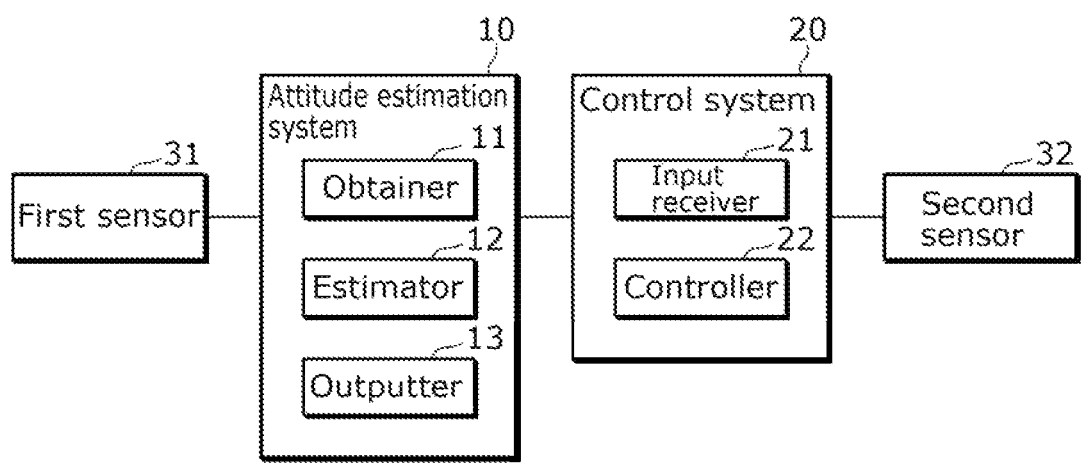
FIG. 1 is a block diagram showing an overview of an attitude estimation system in an embodiment.

The attitude estimation system according to an aspect of the present disclosure includes an obtainer, an estimator, and an outputter. The obtainer obtains a detection result of a first sensor attached to a vehicle. The estimator calculates a relative angle of a road surface with respect to the first sensor, based on the detection result of the first sensor obtained by the obtainer, and estimates a deviation of the vehicle, the road surface being a surface on which the vehicle travels, the deviation being a constant deviation of an attitude of the vehicle with respect to a reference attitude of the vehicle. The outputter outputs attitude information indicating the deviation estimated by the estimator.

This provides the advantage that, on the basis of that a constant deviation of the attitude of the vehicle caused by freight, etc. causes the first sensor attached to the vehicle to also deviate from the predetermined position, it is possible to estimate a constant deviation of the attitude of the vehicle with respect to the reference attitude caused by freight, etc. by calculating a relative angle that corresponds to the deviation of the first sensor from the predetermined position.

In the attitude estimation system according to another aspect of the present disclosure, the reference attitude is an attitude that is based on an angle of the vehicle relative to the road surface.

This provides the advantage that it is possible to estimate a constant deviation of the attitude of the vehicle with respect to the reference attitude, for example, regardless of the type of a road surface, such as an upward inclination and a downward inclination.

In the attitude estimation system according to another aspect of the present disclosure, the first sensor is a sensor that detects a target object in vicinity of the vehicle. The estimator calculates the relative angle, based on a point cloud representing the road surface that is the target object detected by the first sensor.

This provides the advantage that no additional first sensor is required to be prepared because an already equipped sensor for keeping track of the surroundings of the vehicle is used to calculate a relative angle.

In the attitude estimation system according to another aspect of the present disclosure, the first sensor includes a plurality of first sensors that are attached to the vehicle to face mutually different directions. The estimator calculates the relative angle, based on a plurality of point clouds detected by the plurality of first sensors, the plurality of point clouds each being the point cloud.

This provides the advantage of easily increasing robustness because comprehensive calculation of a relative angle is possible, using the detection results of the plurality of first sensors, even when any one of the first sensors is accidentally misaligned such as in the case where the first sensor is attached, at the time of attachment, at a position that deviates from the predetermined position.

In the attitude estimation system according to another aspect of the present disclosure, when variance in the relative angle within a fixed time period exceeds a predetermined value, the estimator does not estimate the deviation or estimates the deviation, using an average angle of the relative angle within the fixed time period.

This provides the advantage of easily preventing decrease in the accuracy of estimating a constant deviation of the attitude of the vehicle with respect to the reference attitude when, for example, a momentary change occurs in the attitude of the vehicle that is, for example, traveling on a road surface with irregularities.

In the attitude estimation system according to another aspect of the present disclosure, the first sensor includes at least one pair of first sensors. One of the first sensors is attached to a front portion of the vehicle and a remaining one of the first sensors is attached to a rear portion of the vehicle. The estimator determines whether the vehicle is entering an inclination, based on the relative angle that is based on a detection result of the one of the first sensors and the relative angle that is based on a detection result of the remaining one of the first sensors, and does not estimate the deviation when the estimator determines that the vehicle is entering the inclination.

This provides the advantage of easily preventing decrease in the accuracy of estimating a constant deviation of the attitude of the vehicle with respect to the reference attitude when, for example, the vehicle enters an upward inclination or a downward inclination.

In the attitude estimation system according to another aspect of the present disclosure, the estimator does not estimate the deviation when the relative angle includes a momentary rise or fall.

This provides the advantage of easily preventing decrease in the accuracy of estimating a constant deviation of the attitude of the vehicle with respect to the reference attitude when, for example, the vehicle enters an upward inclination or a downward inclination, or when the vehicle rapidly accelerates or deaccelerates.

In the attitude estimation system according to another aspect of the present disclosure, the obtainer further obtains a detection result of a speed sensor that detects a speed of the vehicle. The estimator does not estimate the deviation when a change in the speed of the vehicle obtained by the obtainer exceeds a predetermined range.

This provides the advantage of easily preventing decrease in the accuracy of estimating a constant deviation of the attitude of the vehicle with respect to the reference attitude when, for example, the vehicle rapidly deaccelerates or rapidly accelerates.

In the attitude estimation system according to another aspect of the present disclosure, the first sensor is a sensor that detects a target object in vicinity of the vehicle. The estimator does not estimate the deviation when a total number of road surface points is below a predetermined number, the road surface points being included in a point cloud representing the road surface that is the target object detected by the first sensor.

This provides the advantage of easily preventing decrease in the accuracy of estimating a constant deviation of the attitude of the vehicle with respect to the reference attitude when, for example, the vehicle enters a flat road from an upward inclination.

The attitude estimation system according to another aspect of the present disclosure further includes a controller that outputs a control signal to a second sensor that detects whether an obstacle is present in vicinity of the vehicle, the control signal being a signal indicating a threshold used by the second sensor to determine whether the obstacle is present. The controller changes the threshold in accordance with a magnitude of the deviation indicated by the attitude information.

This provides the advantage of facilitating detection of an obstacle, the received power of reflected waves from which is likely to be small, such as a relatively small obstacle, because it possible to set a smaller threshold when freight is not present in the vehicle by changing thresholds used by the second sensor in accordance with the magnitude of a constant deviation of the attitude of the vehicle with respect to the reference attitude.

The control system according to an aspect of the present disclosure includes an input receiver and a controller. The input receiver obtains attitude information indicating a deviation of a vehicle, the deviation being a constant deviation of an attitude of the vehicle with respect to a reference attitude of the vehicle. The controller outputs a control signal to a second sensor that detects whether an obstacle is present in vicinity of the vehicle, based on the attitude information obtained by the input receiver, the control signal being a signal indicating a threshold used by the second sensor to determine whether the obstacle is present. The controller changes the threshold in accordance with a magnitude of the deviation indicated by the attitude information.

This provides the advantage of facilitating the detection of an obstacle, the received power of reflected waves from which is likely to be small, such as a relatively small obstacle, because it possible to set a smaller threshold when freight is not present in the vehicle by changing thresholds used by the second sensor in accordance with the magnitude of a constant deviation of the attitude of the vehicle with respect to the reference attitude.

In the attitude estimation method according to an aspect of the present disclosure, a detection result of a first sensor attached to a vehicle is obtained. In the attitude estimation method, a relative angle of a road surface with respect to the first sensor is calculated, based on the detection result of the first sensor obtained, and a deviation of the vehicle is calculated, the road surface being a surface on which the vehicle travels, the deviation being a constant deviation of an attitude of the vehicle with respect to a reference attitude of the vehicle.

This provides the advantage that, on the basis of that a constant deviation of the attitude of the vehicle caused by freight, etc. causes the first sensor attached to the vehicle to also deviate from the predetermined position, it is possible to estimate a constant deviation of the attitude of the vehicle with respect to the reference attitude caused by freight, etc. by calculating a relative angle that corresponds to the deviation of the first sensor from the predetermined position.

Note that these general and specific aspects may be implemented using a system, a method, an integrated circuit, a computer program, or a computer-readable recording medium such as a CD-ROM, or any combination of systems, methods, integrated circuits, computer programs, and recording media.

Hereinafter, a certain exemplary embodiment is described in greater detail with reference to the accompanying Drawings. The exemplary embodiment described below shows a general or specific example. The numerical values, shapes, elements, the arrangement and connection of the elements, steps, the processing order of the steps, etc. shown in the following exemplary embodiment are mere examples, and therefore do not limit the scope of the present disclosure. Therefore, among the elements in the following exemplary embodiment, those not recited in any one of the independent claims are described as optional elements.

Also note that the drawings are schematic diagrams, and thus they are not always exactly illustrated. Also, the same reference marks are assigned to the elements that are substantially the same throughout the drawings.

<Configuration>

Figure 2:
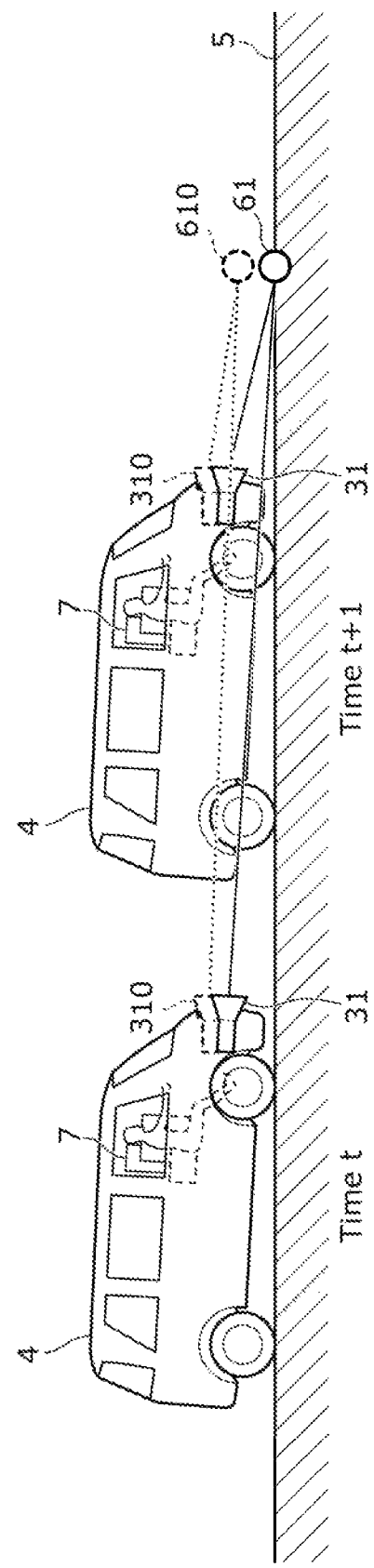
FIG. 2 is a diagram for explaining example operations performed by an estimator of the attitude estimation system in the embodiment.

FIG. 1 is a block diagram showing an overview of attitude estimation system 10 in the embodiment. FIG. 2 is a diagram for explaining example operations performed by attitude estimation system 10 in the embodiment.

Attitude estimation system 10 in the embodiment is a system for estimating the attitude (pitch angle, yaw angle, and roll angle) of vehicle 4 such as an automobile. In particular, attitude estimation system 10 in the embodiment is a system not for estimating a momentary deviation of the attitude of vehicle 4 with respect to the reference attitude, when, for example, vehicle 4 travels on road surface 5 with irregularities or enters an upward inclination or a downward inclination from a flat road, but for estimating a constant deviation of the attitude of vehicle 4 with respect to the reference attitude. The embodiment describes an example case where vehicle 4 is an automobile, but vehicle 4 is not limited to an automobile. Vehicle 4 may thus be, for example, a mobile object, such as an agricultural machine and an industrial machine, including a spring such as a suspension spring.

In the present description, the reference attitude refers to an attitude that serves as the reference when vehicle 4 is traveling on road surface 5. More specifically, the reference attitude refers to a state in which the longitudinal direction of vehicle 4 is in parallel with road surface 5, that is, a state in which a pitch angle is zero degrees. Note that "in parallel" here means not only perfectly parallel but also substantially parallel. Similarly, "zero degrees" here means not only perfectly zero degrees but also substantially zero degrees.

In the embodiment, the reference attitude is not an attitude of vehicle 4 that is based on an absolute angle with respect to a flat road serving as the reference plane but an attitude of vehicle 4 that is based on a relative angle with respect to road surface 5. Stated differently, the reference attitude in the embodiment is an attitude of vehicle 4 that does not depend on inclination of road surface 5. Attitude estimation system 10 in the embodiment thus estimates a relative and constant deviation of the attitude of vehicle 4 with respect to road surface 5.

Also, in the present description, a constant deviation of the attitude of vehicle 4 with respect to the reference attitude refers to a state in which vehicle 4 is inclined with respect to the reference attitude due to an external cause, and vehicle 4 remains permanently inclined with respect to road surface 5 unless such external cause is removed. A constant deviation of the attitude of vehicle 4 with respect to the reference attitude can occur, for example, when freight 7 is concentrated on part of vehicle 4 (e.g., front portion, rear portion, left portion, or right portion of vehicle 4). Freight 7 is, for example, a passenger onboard in vehicle 4, a baggage loaded on vehicle 4, and so forth. Note that in FIG. 2 and the subsequent drawings to be referred to in the following description, freight 7 is placed in vehicle 4, but this illustration is not intended to limit the form of freight 7.

The following describes an example in which a constant deviation of the attitude of vehicle 4 with respect to road surface 5 is a pitch angle of vehicle 4 with respect to road surface 5. Note that such deviation is not limited to a pitch angle, and thus may be represented by a roll angle or a yaw angle. When freight 7 is concentrated on a left portion or a right portion of vehicle 4 in the width direction of vehicle 4, for example, the foregoing deviation can be represented by a roll angle of vehicle 4 with respect to road surface 5.

Attitude estimation system 10 includes, for example, a computer including a memory and a processor (microprocessor). The processor executes a control program stored in the memory, thereby controlling each of the units in attitude estimation system 10 and realizing various functions. Note that examples of the memory include a read only memory (ROM) that preliminarily stores a program and data and a random access memory (RAM) that is used to store data, etc. in the execution of the program. The memory may include, for example, a non-volatile memory.

Attitude estimation system 10 is implemented by, for example, an electronic control unit (ECU) that controls first sensor 31 (to be described later) included in vehicle 4. Note that attitude estimation system 10 is not limited to an ECU that controls first sensor 31, and thus may be implemented by other ECUs. Attitude estimation system 10 may also be implemented by an independent signal processing circuit that is different from an ECU.

As shown in FIG. 1, attitude estimation system 10 includes obtainer 11, estimator 12, and outputter 13.

Obtainer 11 obtains a detection result of first sensor 31 attached to vehicle 4. First sensor 31 is a sensor that detects a target object in the vicinity of vehicle 4. First sensor 31 is, for example, a sensor for advanced driver-assistance systems (ADAS). Internally or externally included in vehicle 4, first sensor 31 sequentially detects a target object in the vicinity of vehicle 4 (for example, at predetermined time intervals such as at the intervals of 1/60 seconds). First sensor 31 is, for example, an imaging sensor (camera) that detects light and so forth in the vicinity of vehicle 4. Such camera may either be a stereo camera or a monocular camera. Other examples of first sensor 31 may include a radar that detects reflection of electromagnetic waves and a light detection and ranging (LiDAR) that detects reflection of laser light.

Estimator 12 calculates relative angle θ1 that is a relative angle of road surface 5 on which vehicle 4 travels with respect to first sensor 31 (refer to FIG. 5), on the basis of the detection result of first sensor 31 obtained by obtainer 11, and estimates a constant deviation of the attitude of vehicle 4 with respect to the reference attitude. In the present embodiment, estimator 12 calculates relative angle θ1 on the basis of a point cloud representing road surface 5 that is a target object detected by first sensor 31.

The following specifically describes processes performed by estimator 12. FIG. 2 is a diagram for explaining example operations performed by estimator 12 of attitude estimation system 10 in the embodiment. In FIG. 2, vehicle 4 is in an attitude in which a front portion of vehicle 4 is constantly inclined toward road surface 5 due to the presence of freight 7 in the front portion. For this reason, in FIG. 2, the position of first sensor 31 constantly deviates, in the height direction and the pitch direction, from predetermined position 310 that is the position of first sensor 31 when vehicle 4 is in the reference attitude.

The following description assumes that first sensor 31 is a monocular camera or a stereo camera whose detection region is the forward direction of vehicle 4. The following description also assumes that estimator 12 performs image processing, such as structure from motion (SfM) and simultaneous localization and mapping (SLAM), on an image captured by first sensor 31, thereby generating a three-dimensional image and point cloud data of the surroundings of vehicle 4 (here, the forward direction of vehicle 4). The following description focuses on road surface point 61 that is an arbitrary point on road surface 5 included in the point cloud data.

The following describes an example in which first sensor 31 is a monocular camera and the position of road surface point 610 that is projected on a three-dimensional image is calculated by performing stereo matching in chronological order. Although not described in the following, when first sensor 31 is a stereo camera, it is also possible to calculate the position of road surface point 610 projected on a three-dimensional image by performing stereo matching in non-chronological order.

First, estimator 12 performs matching between road surface point 61 imaged at time t by first sensor 31 and road surface point 61 imaged at time t+1 by first sensor 31. Here, the interval between time t and time t+1 depends on the frame rate of first sensor 31. An example of the interval between time t and time t+1 is 1/60 seconds.

Subsequently, estimator 12 performs triangulation among three points, that is, the position of first sensor 31 at time t, the position of first sensor 31 at time t+1, and road surface point 61 obtained by the matching. Through this, estimator 12 calculates a relative positional relationship among these three points. Estimator 12 then calculates the position of road surface point 610 projected on the three-dimensional image, on the basis of the positional relationship calculated, predetermined position 310 of first sensor 31 at time t, and predetermined position 310 of first sensor 31 at time t+1.

Figure 3:
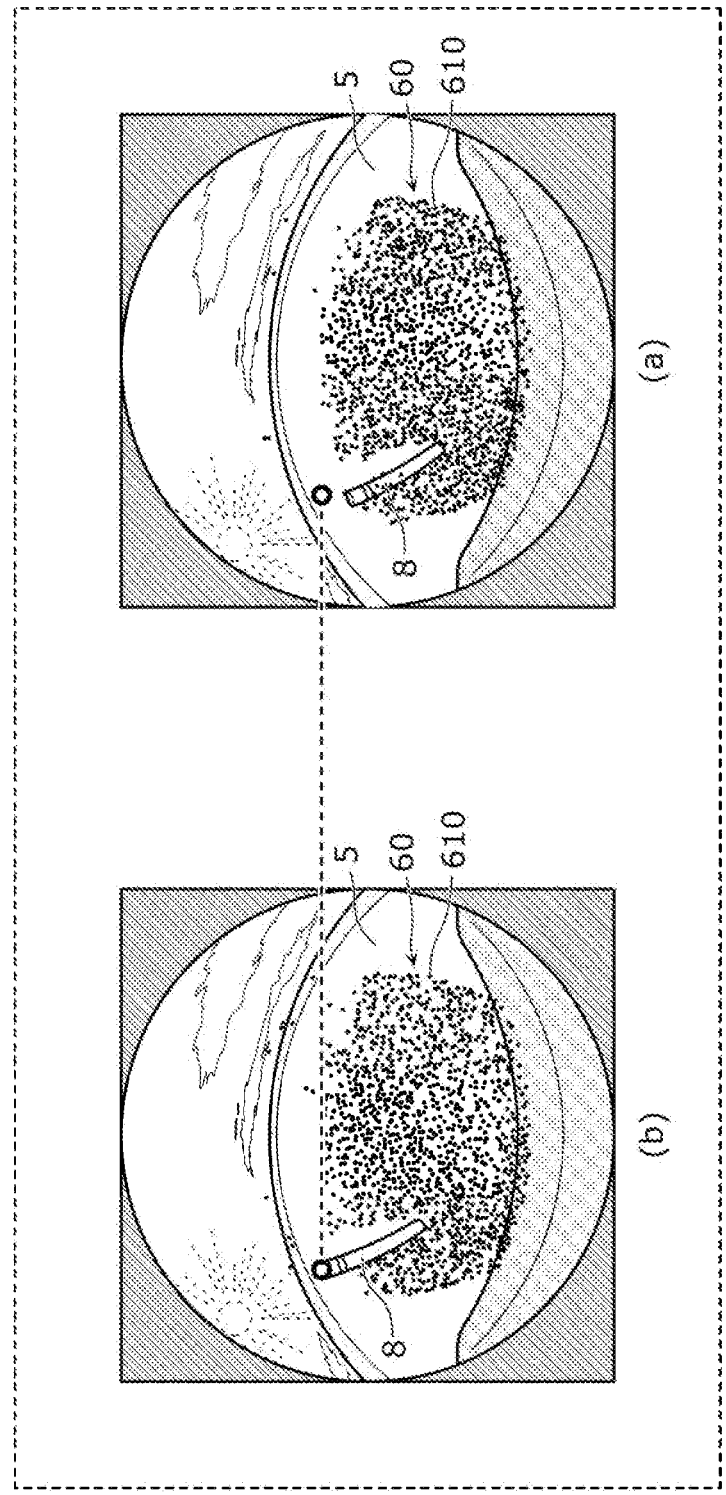
FIG. 3 is a diagram showing example three-dimensional images generated by the estimator of the attitude estimation system in the embodiment.

FIG. 3 is a diagram showing example three-dimensional images generated by estimator 12 of attitude estimation system 10 in the embodiment. (a) in FIG. 3 shows a three-dimensional image when freight 7 is not present in vehicle 4 and (b) in FIG. 3 shows a three-dimensional image when freight 7 is present in vehicle 4. In each of (a) and (b) in FIG. 3, point cloud 60 represents a group of a large number of road surface points 610. Further, on the three-dimensional image of each of (a) and (b) in FIG. 3, a stick-like object 8 that is present on road surface 5 is projected.

As shown in (b) in FIG. 3, a deviation of first sensor 31 from predetermined position 310 caused by the presence of freight 7 in vehicle 4 is reflected on the three-dimensional image without being corrected. Stated differently, if the foregoing deviation were corrected, the three-dimensional image would be as shown in (a) in FIG. 3. However, since the deviation remains uncorrected, the three-dimensional image is as shown in (b) in FIG. 3. Such deviation corresponds to the difference between the position of the tip of object 8 in (a) in FIG. 3 and the position of the tip of object 8 in (b) in FIG. 3.

Figure 4:
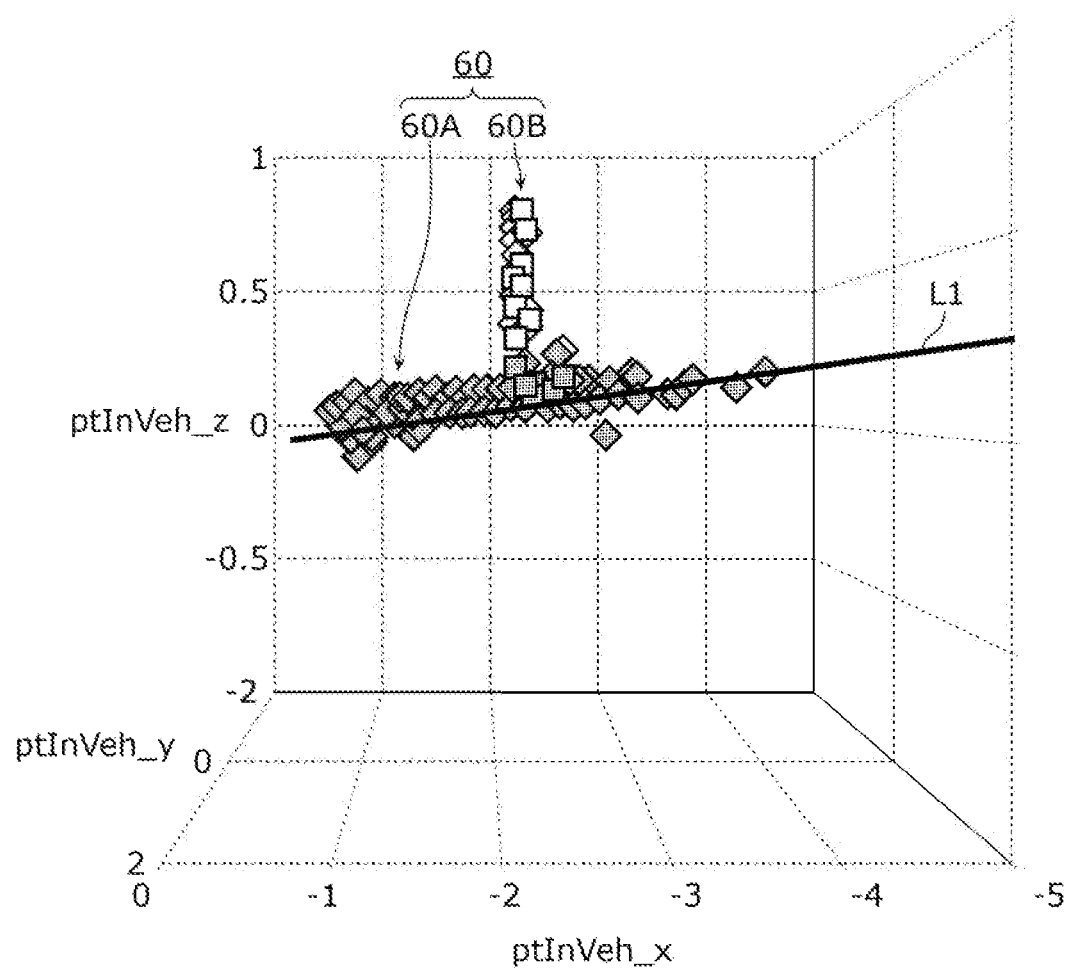
FIG. 4 is a diagram showing a point cloud that is generated by the estimator of the attitude estimation system in the embodiment and projected on a plane viewed from the width direction of a vehicle in which freight is present.

Here, the deviation of first sensor 31 from predetermined position 310 is reflected not only on object 8 projected on the three-dimensional image, but also on point cloud 60 projected on the three-dimensional image. More specifically, when viewed from the width direction of vehicle 4, point cloud 60 in the three-dimensional image shown in (b) in FIG. 3 is represented by an image as shown in FIG. 4. FIG. 4 is a diagram showing point cloud 60 that is generated by estimator 12 of attitude estimation system 10 in the embodiment and projected on a plane viewed from the width direction of vehicle 4 in which freight 7 is present. In FIG. 4, the lateral axis indicates the direction horizontal to road surface 5 and the vertical axis indicates the direction perpendicular to road surface 5. Among point cloud 60 in FIG. 4, point cloud 60A is a point cloud representing road surface in the three-dimensional image and point cloud 60B is a point cloud representing object 8 in the three-dimensional image.

When viewed from the width direction of vehicle 4, as shown in FIG. 4, point cloud 60A representing road surface 5 in the three-dimensional image is projected on the plane in a manner that point cloud 60A is away from the lateral axis toward the forward direction. Such point cloud 60A is approximated to line L1 (or plane) that is inclined in a direction away from road surface 5 toward the forward direction of vehicle 4.

Figure 5:
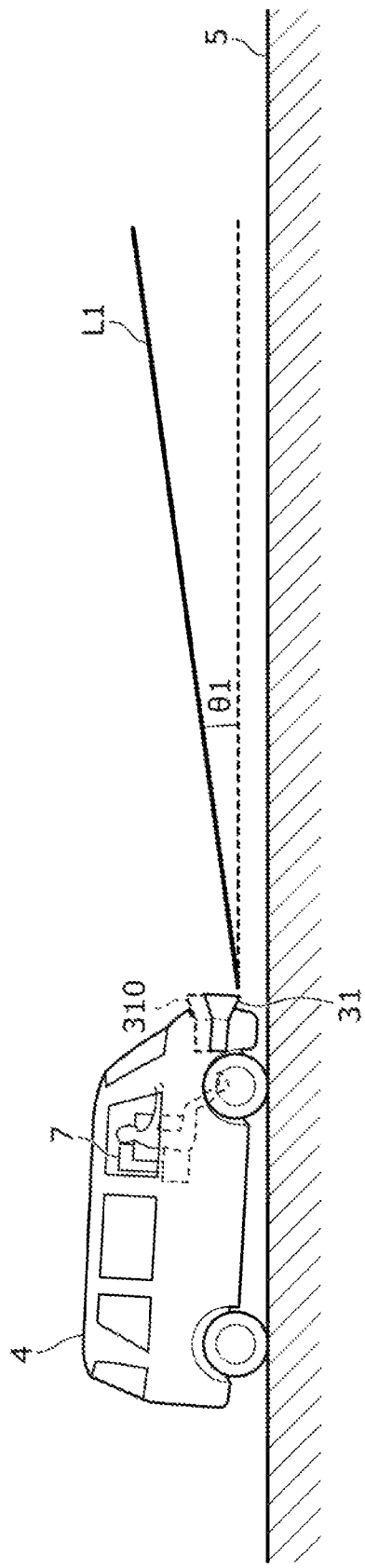
FIG. 5 is a diagram for explaining the correlation between a constant deviation of the attitude of the vehicle with respect to a road surface and a relative angle in the embodiment.

FIG. 5 is a diagram for explaining the correlation between a constant deviation of the attitude of vehicle 4 with respect to road surface 5 and relative angle θ1 in the embodiment. As shown in FIG. 5, line L1 represents the inclination of road surface 5 that is projected on the three-dimensional image when first sensor 31 is assumed to be present in predetermined position 310. From this inclination of line L1, angle θ1 formed by line L1 and the actual road surface 5, that is, relative angle θ1 is calculated which is a relative angle of road surface 5 with respect to first sensor 31.

The deviation of first sensor 31 from predetermined position 310 (relative angle θ1) corresponds to a relative and constant deviation of the attitude of vehicle 4 with respect to road surface 5 (pitch angle of vehicle 4 with respect to road surface 5) caused by the presence of freight 7 in vehicle 4.

It is thus possible for estimator 12 to calculate relative angle θ1 on the basis of the detection result of first sensor 31, thereby estimating a constant deviation of the attitude of vehicle 4 with respect to the reference attitude. In particular, in the embodiment, estimator 12 estimates, as the foregoing deviation, a relative and constant deviation of the attitude of vehicle 4 with respect to road surface 5.

Outputter 13 outputs attitude information that indicates the foregoing deviation estimated by estimator 12, that is, a constant deviation of the attitude of vehicle 4 with respect to the reference attitude. In the embodiment, outputter 13 outputs the foregoing relative angle θ1 as the attitude information. Also, as shown in FIG. 1, outputter 13 in the embodiment outputs the attitude information to control system 20.

Control system 20 includes, for example, a computer including a memory and a processor (microprocessor). The processor executes a control program stored in the memory, thereby controlling each of the units in control system 20 and realizing various functions. Note that examples of the memory include a ROM that preliminarily stores a program and data and a RAM that is used to store data, etc. in the execution of the program. The memory may include, for example, a non-volatile memory.

Control system 20 is implemented by, for example, an ECU that controls second sensor 32 included in vehicle 4. Note that control system 20 is not limited to an ECU that controls second sensor 32, and thus may be implemented by other ECUs. Control system 20 may also be implemented by an independent signal processing circuit that is different from an ECU.

Second sensor 32 is a sensor that detects the presence/absence of an obstacle in the vicinity of vehicle 4. Internally or externally included in vehicle 4, second sensor 32 sequentially detects the presence/absence of an obstacle in the vicinity of vehicle 4 (for example, at predetermined time intervals such as at the intervals of 1/60 seconds). Second sensor 32 is, for example, a time of flight (ToF) sensor. Second sensor 32 radiates transmission waves to the detection region and receives reflected waves from an object that is present in the detection region, thereby detecting the presence/absence of an obstacle. In the embodiment, second sensor 32 is a sonar that radiates ultrasonic waves as transmission waves. Other examples of second sensor 32 may include a radar that transmits electromagnetic waves as transmission waves and a two-dimensional LiDAR that transmits laser light as transmission waves.

As shown in FIG. 1, control system 20 includes input receiver 21 and controller 22.

Input receiver 21 obtains the attitude information that indicates a constant deviation of the attitude of vehicle 4 with respect to the reference attitude. In the embodiment, input receiver 21 obtains the attitude information outputted from outputter 13 of attitude estimation system 10.

Controller 22 outputs, to second sensor 32, a control signal that indicates a threshold used by second sensor 32 to determine the presence/absence of an obstacle on the basis of the attitude information obtained by input receiver 21.

The following describes the threshold used by second sensor 32. As already described above, second sensor 32 radiates transmission waves to the detection region and receives reflected waves from an object that is present in the detection region, thereby detecting the presence/absence of an obstacle. Here, the object includes not only an obstacle but also road surface 5. Stated differently, second sensor 32 receives not only the reflected waves reelected at an obstacle, but also the reflected waves reflected at road surface 5. For this reason, second sensor 32 is configured to distinctively detect an obstacle and road surface 5 by comparing the received power of the reflected waves with the threshold. Stated differently, since the received power of the reflected waves from an obstacle is basically greater than the received power of the reflected waves from road surface 5, it is possible to distinguish between an obstacle and road surface 5 by setting a threshold for received power as appropriate.

Controller 22 changes thresholds in accordance with the magnitude of the foregoing deviation indicated by the attitude information. In the embodiment, with the threshold for relative angle θ1 of zero degrees serving as the reference threshold, controller 22 sets a greater value to the threshold than the reference threshold as relative angle θ1 is greater. Such processing performed by controller 22 will be described in detail in <Advantages> to be described later.

<Operations>

Figure 6:
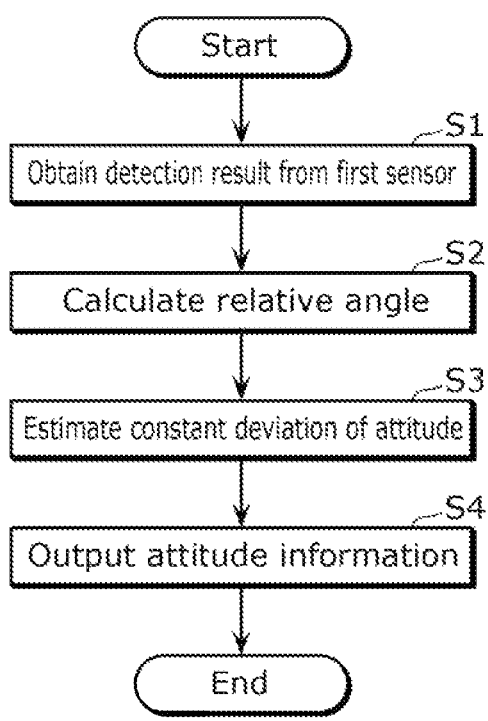
FIG. 6 is a flowchart of example operations performed by the attitude estimation system in the embodiment.

With reference to FIG. 6, the following describes example operations (in other words, an example of the attitude estimation method) performed by attitude estimation system 10. FIG. 6 is a flowchart of example operations performed by attitude estimation system 10 in the embodiment. First, obtainer 11 obtains a detection result from first sensor 31 at regular time intervals (S1).

Next, estimator 12 calculates relative angle θ1 on the basis of the detection result of first sensor 31 obtained by obtainer 11 (S2). More specifically, estimator 12 calculates line L1 that represents the inclination of road surface 5 projected on the three-dimensional image when first sensor 31 is assumed to be present in predetermined position 310, on the basis of point cloud 60 representing road surface 5 that is a target object detected by first sensor 31. Estimator 12 then calculates, from the calculated inclination of line L1, an angle formed by line L1 and the actual road surface 5, that is, relative angle θ1.

Subsequently, estimator 12 estimates a constant deviation of the attitude of vehicle 4 with respect to the reference attitude from relative angle θ1 calculated (S3). More specifically, estimator 12 regards relative angle θ1 calculated as a relative and constant deviation (pitch angle) of the attitude of vehicle 4 with respect to road surface 5. After that, outputter 13 outputs attitude information that indicates the foregoing deviation estimated by estimator 12, that is, a constant deviation of the attitude of vehicle 4 with respect to the reference attitude (S4). More specifically, outputter 13 outputs, to control system 20, relative angle θ1 calculated by estimator 12 as the attitude information.

<Advantages>

Figure 7:
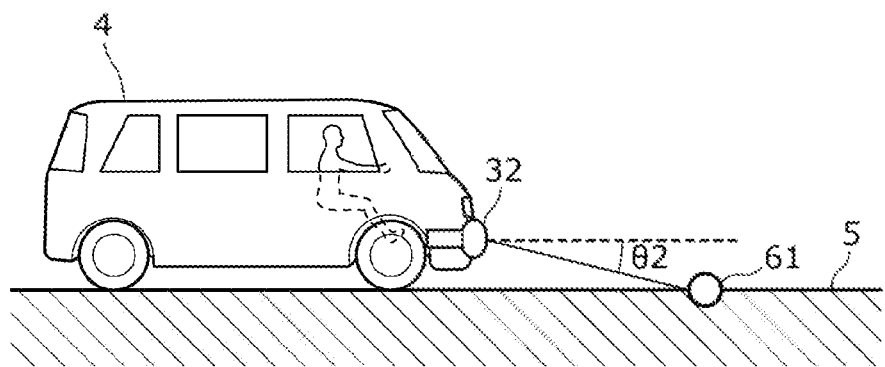
FIG. 7 is a diagram for explaining operations performed by a second sensor when freight is not present in the vehicle.
Figure 8:
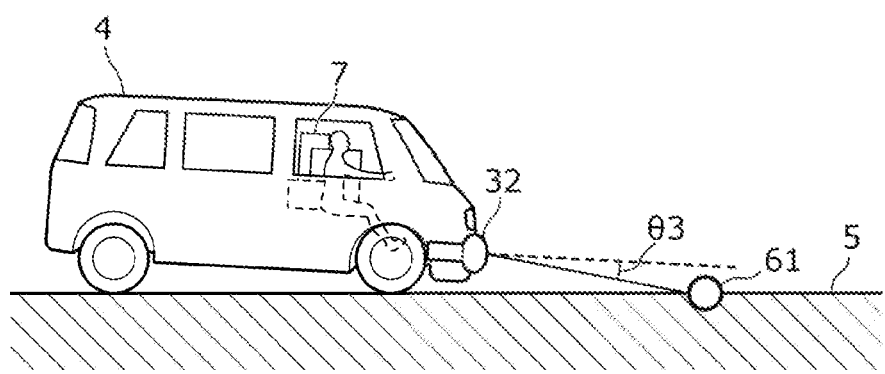
FIG. 8 is a diagram for explaining operations performed by the second sensor when freight is present in the vehicle.
Figure 9:
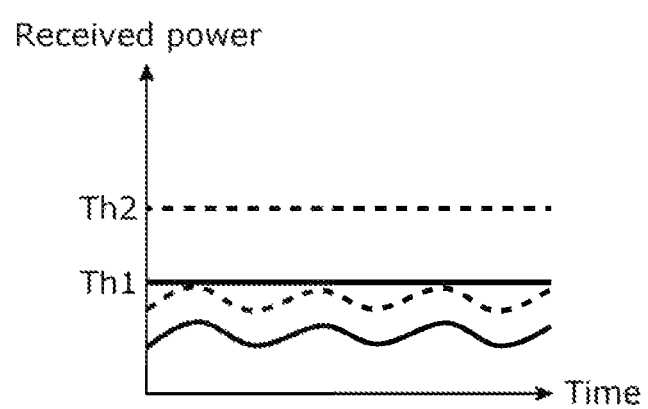
FIG. 9 is a diagram for explaining a problem to be solved when freight is present in the vehicle.

The following describes the advantages of attitude estimation system 10 in the embodiment. First, with reference to FIG. 7 through FIG. 9, the circumstances leading to the estimation by attitude estimation system 10 of a constant deviation of the attitude of vehicle 4 with respect to the reference attitude will be described. FIG. 7 is a diagram for explaining operations performed by second sensor 32 when freight 7 is not present in vehicle 4. FIG. 8 is a diagram for explaining operations performed by second sensor 32 when freight 7 is present in vehicle 4. FIG. 9 is a diagram for explaining a problem to be solved when freight 7 is present in vehicle 4. In FIG. 9, the lateral axis indicates time and the vertical axis indicates the received power of the reflected waves received by second sensor 32.

As shown in each of FIG. 7 and FIG. 8, the following description assumes that second sensor 32 radiates transmission waves in the forward direction and receives reflected waves from road surface point 61. Here, as shown in FIG. 7, an angle is defined as "θ2" that is formed by: the central axis (refer to the broken line in FIG. 7) which runs through the center of second sensor 32 and on which the transmission intensity and the reception intensity are greater at the front portion of second sensor 32 than those of other directions; and the line that connects the center of second sensor 32 and road surface point 61. Similarly, as shown in FIG. 8, an angle is defined as "θ3" that is formed by: the central axis (refer to the broken line in FIG. 8) which runs through the center of second sensor 32 and on which the transmission intensity and the reception intensity are greater at the front portion of second sensor 32 than those of other directions; and the line that connects the center of second sensor 32 and road surface point 61.

When the attitude of vehicle 4 constantly deviates due to the presence of freight 7 in vehicle 4 as shown in FIG. 8, angle 83 is smaller than θ2 compared to the case where vehicle 4 keeps the reference attitude in the absence of freight 7 in vehicle 4 as shown in FIG. 7. For this reason, even when the reflected waves from the same road surface point 61 are concerned, the received power of the reflected waves received by second sensor 32 is greater when the attitude of vehicle 4 constantly deviates (see the broken wavy line in FIG. 9) than when vehicle 4 keeps the reference attitude (see the solid wavy line in FIG. 9).

As already described above, second sensor 32 is configured to distinctively detect an obstacle and road surface 5 by comparing the received power of reflected waves with the threshold. Assume, for example, that such threshold is first threshold Th1 as shown in FIG. 9. When vehicle 4 keeps the reference attitude as shown in FIG. 7, the received power of the reflected waves from road surface point 61 on road surface 5 is smaller enough than first threshold Th1. It is thus possible for second sensor 32 to clearly and distinctively detect an obstacle and road surface 5.

However, when the attitude of vehicle 4 constantly deviates as shown in FIG. 8, the received power of the reflected waves from road surface point 61 on road surface 5 is almost equal to or can be greater than first threshold Th1. This causes the possibility that second sensor 32 mistakenly detects road surface 5 as an obstacle.

A possible solution to such problem is, for example, to set a greater threshold on the assumption that the attitude of vehicle 4 constantly deviates. More specifically, it can be considered that second threshold Th2 that is greater than first threshold Th1 is set as the threshold as shown in FIG. 9. In this case, even when the attitude of vehicle 4 constantly deviates, the received power of the reflected waves from road surface point 61 on road surface 5 is smaller enough than second threshold Th2. It is thus possible for second sensor 32 to clearly and distinctively detect an obstacle and road surface 5.

However, when a greater threshold is simply set as described above, another problem described below arises. That is to say, when an obstacle, the received power of reflected waves from which is likely to be small, such as a relatively small obstacle, is present on road surface 5, the received power of the reflected waves from such obstacle does not exceed second threshold Th2. This poses a problem that second sensor 32 fails to detect an obstacle.

On the other hand, attitude estimation system 10 in the embodiment has the following advantages. That is to say, on the basis of that a constant deviation of the attitude of vehicle 4 caused by freight 7, etc. causes first sensor 31 attached to vehicle 4 to also deviate from predetermined position 310, attitude estimation system in the embodiment is capable of estimating a constant deviation of the attitude of vehicle 4 with respect to the reference attitude caused by freight 7, etc. by calculating relative angle θ1 that corresponds to the deviation of first sensor 31 from predetermined position 310.

It is thus possible to solve the foregoing problem if control system 20 refers to the foregoing deviation estimated by attitude estimation system 10. Stated differently, by changing thresholds used by second sensor 32 in accordance with the magnitude of the foregoing deviation, it is possible to set a smaller threshold when vehicle 4 keeps the reference attitude in the absence of freight 7 in vehicle 4. This provides the advantage of facilitating the detection of an obstacle, the received power of reflected waves from which is likely to be small, such as a relatively small obstacle.

In an example shown in FIG. 9, for example, first threshold Th1 is set as the threshold used by second sensor 32 when the magnitude of the foregoing deviation estimated by attitude estimation system 10 is small or when the foregoing deviation is not present, and second threshold Th2 is set as the threshold used by second sensor 32 when the magnitude of the foregoing deviation estimated by attitude estimation system 10 is big. By dynamically changing thresholds used by second sensor 32 in accordance with the magnitude of the foregoing deviation in this manner, it is possible for second sensor 32 to clearly and distinctively detect an obstacle and road surface 5 even when the attitude of vehicle 4 constantly deviates. This also enables second sensor 32 to easily detect an obstacle, the received power of the reflected waves from which is likely to be small also in the case where vehicle 4 keeps the reference attitude.

<Variations>

The attitude estimation system according to the present disclosure has been described above on the basis of the foregoing embodiment, but the present disclosure is not limited to such embodiment. The scope of the present disclosure may also include an embodiment achieved by making various modifications to the foregoing embodiment that can be conceived by those skilled in the art without departing from the essence of the present disclosure.

<Variation 1>

FIG. 10 is a diagram for explaining attitude estimation system in Variation 1 of the embodiment. (a) in FIG. 10 shows vehicle 4 in which freight 7 is present is traveling on road surface 5 with irregularities. (b) in FIG. 10 shows chronological variations in relative angle θ1 when vehicle 4 travels on road surface 5 with irregularities. As shown in (b) in FIG. 10, when vehicle 4 travels on road surface 5 with irregularities, momentary variations occur in relative angle θ1 (see the circled portion in (b) in FIG. 10). When attitude information that includes such momentary variations in relative angle θ1, that is, momentary changes in the attitude of vehicle 4 is outputted to control system 20, the threshold used by second sensor 32 also changes in line with the momentary changes in the attitude of vehicle 4. This can affect the capability of obstacle detection.

In view of this, estimator 12 of attitude estimation system 10 in Variation 1 determines whether the variance in relative angle θ1 within a fixed time period exceeds a predetermined value, thereby determining whether a momentary change is occurring in the attitude of vehicle 4. When the variance in relative angle θ1 within the fixed time period exceeds the predetermined value, estimator 12 does not estimate relative angle θ1, that is, estimator 12 does not estimate a constant deviation of the attitude of vehicle 4 with respect to the reference attitude. Alternatively, when the variance in relative angle θ1 within the fixed time period exceeds the predetermined value, estimator 12 estimates the foregoing deviation, using an average angle of relative angle θ1 within the fixed time period. Here, "estimator 12 does not estimate the deviation" not only means that estimator 12 does not preform the processing of estimating the deviation, but can also mean that estimator 12 estimates the deviation but rejects the estimation result.

Variation 1 provides the advantage of easily preventing decrease in the accuracy of estimating a constant deviation of the attitude of vehicle 4 with respect to the reference attitude when, for example, a momentary change occurs in the attitude of vehicle 4 that is, for example, traveling on road surface 5 with irregularities. In particular, Variation 1 does not subject the threshold used by second sensor 32 to change in line with momentary changes in the attitude of vehicle 4 because attitude information that excludes the momentary variations in relative angle θ1 is outputted to control system 20. This less affects the capability of obstacle detection.

<Variation 2>

Figure 11:
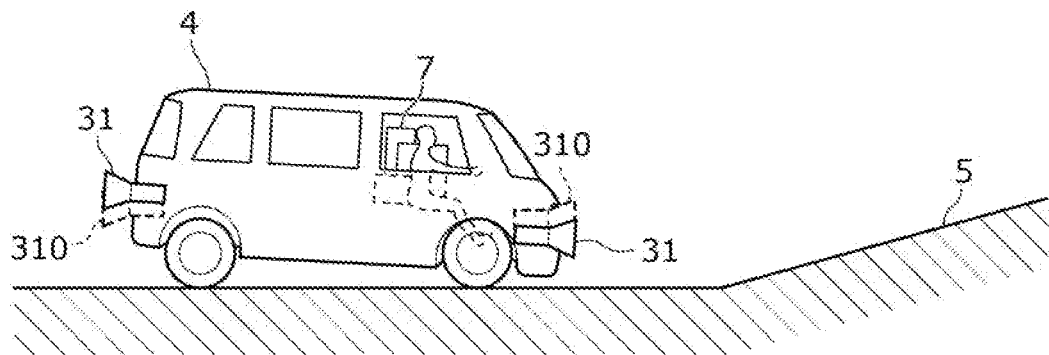
FIG. 11 is a diagram for explaining an attitude estimation system in Variation 2 of the embodiment.

FIG. 11 is a diagram for explaining attitude estimation system in Variation 2 of the embodiment. FIG. 11 shows vehicle 4 in which freight 7 is present is entering an upward inclination of road surface 5. When vehicle 4 enters an upward inclination (or downward inclination) of road surface 5 as in this case, momentary variations occur in relative angle θ1 although such variations are gentle compared to the case where vehicle 4 is traveling on road surface 5 with irregularities. When attitude information that includes such momentary variations in relative angle θ1, that is, momentary changes in the attitude of vehicle 4, is outputted to control system 20, the threshold used by second sensor 32 also changes in line with the momentary changes in the attitude of vehicle 4. This can affect the capability of obstacle detection.

In view of this, attitude estimation system 10 in Variation 2 solves the foregoing problem on the assumption that at least one pair of first sensors 31 is attached to vehicle 4, as shown in FIG. 11, with one of first sensors 31 attached at a front portion of vehicle 4 and the other of first sensors 31 attached to a rear portion of vehicle 4. Stated differently, estimator 12 determines whether vehicle 4 is entering an inclination, on the basis of relative angle θ1 that is based on the detection result of one of first sensors 31 and relative angle θ1 that is based on the detection result of the other of first sensors 31.

Here, when vehicle 4 enters an inclination, a difference occurs between relative angle θ1 that is based on the detection result of one of first sensors 31 and relative angle θ1 that is based on the detection result of the other of first sensors 31, compared to the timing before vehicle 4 enters an inclination. Estimator 12 determines whether vehicle 4 is entering an inclination, on the basis of whether such difference exceeds a predetermined value. When the foregoing difference exceeds the predetermined value, that is, when estimator 12 determines that vehicle 4 is entering an inclination, estimator 12 does not estimate relative angle θ1, that is, estimator 12 does not estimate a constant deviation of the attitude of vehicle 4 with respect to the reference attitude.

Variation 2 provides the advantage of easily preventing decrease in the accuracy of estimating a constant deviation of the attitude of vehicle 4 with respect to the reference attitude when, for example, vehicle 4 enters an upward inclination or a downward inclination. In particular, as with Variation 1, Variation 2 does not subject the threshold used by second sensor 32 to change in line with a momentary change in the attitude of vehicle 4. This less affects the capability of obstacle detection.

<Variation 3>

Figure 12:
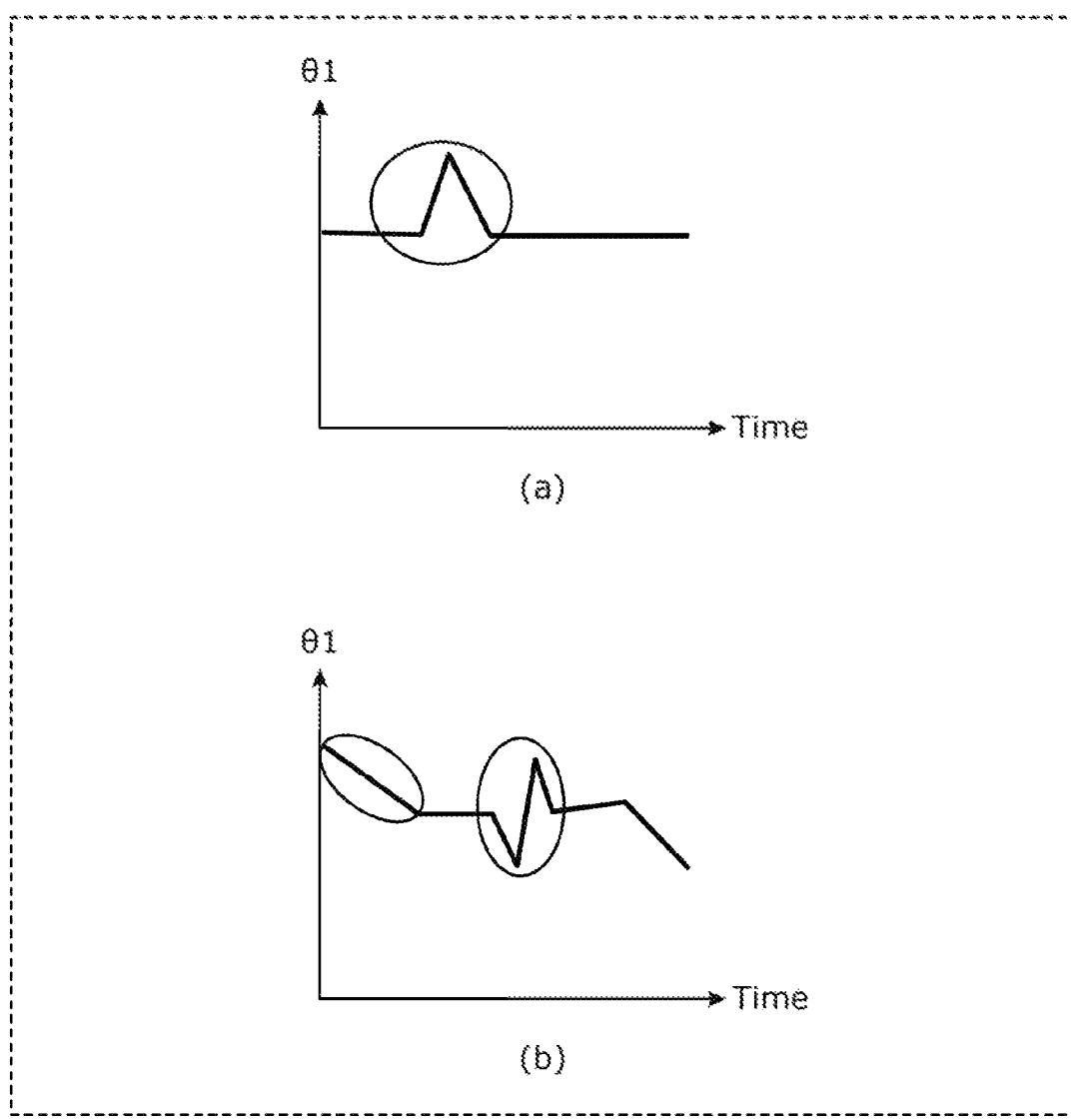
FIG. 12 is a diagram for explaining an attitude estimation system in Variation 3 of the embodiment.

FIG. 12 is a diagram for explaining attitude estimation system in Variation 3 of the embodiment. (a) in FIG. 12 shows chronological variations in relative angle θ1 when vehicle 4 in which freight 7 is present is entering an inclination (here, upward inclination). (b) in FIG. 12 shows chronological variations in relative angle θ1 when vehicle 4 rapidly accelerates and then rapidly deaccelerates. As shown in (a) and (b) in FIG. 12, when vehicle 4 enters an upward inclination or vehicle 4 rapidly accelerates or deaccelerates, a momentary rise or fall occurs in relative angle θ1 (see the circled portions in FIG. 12). When attitude information that includes such momentary variations in relative angle θ1, that is, momentary changes in the attitude of vehicle 4 is outputted to control system 20, the threshold used by second sensor 32 also changes in line with the momentary changes in the attitude of vehicle 4. This can affect the capability of obstacle detection.

In view of this, estimator 12 of attitude estimation system 10 in Variation 3 determines whether relative angle θ1 includes a momentary rise or fall, thereby determining whether vehicle 4 is entering an inclination or whether vehicle 4 is rapidly accelerating or deaccelerating. When a state in which relative angle θ1 exceeds a first predetermined value occurs within a relatively short fixed time period, for example, estimator 12 determines that relative angle θ1 includes a momentary rise. Meanwhile, when a state in which relative angle θ1 is below a second predetermined value (which is smaller than the first predetermined value) occurs within a relatively short fixed time period, for example, estimator 12 determines that relative angle θ1 includes a momentary fall. When relative angle θ1 includes a momentary rise or fall, estimator 12 does not estimate relative angle θ1, that is, estimator 12 does not estimate a constant deviation of the attitude of vehicle 4 with respect to the reference attitude.

Variation 3 provides the advantage of easily preventing decrease in the accuracy of estimating a constant deviation of the attitude of vehicle 4 with respect to the reference attitude when, for example, vehicle 4 enters an upward inclination or a downward inclination, or when vehicle 4 rapidly accelerates or deaccelerates. In particular, as with Variation 1 or Variation 2, Variation 3 does not subject the threshold used by second sensor 32 to change in line with momentary changes in the attitude of vehicle 4. This less affects the capability of obstacle detection.

<Variation 4>

FIG. 13 is a diagram for explaining attitude estimation system in Variation 4 of the embodiment. (a) in FIG. 13 shows vehicle 4 in which freight 7 is present is rapidly deaccelerating by braking hard. (b) in FIG. 13 shows chronological variations in relative angle θ1 when vehicle 4 rapidly accelerates and then rapidly deaccelerates. As shown in (b) in FIG. 13, when vehicle 4 rapidly deaccelerates or rapidly accelerates, momentary variations occur in relative angle θ1 (see the circled portions in FIG. 12). When attitude information that includes such momentary variations in relative angle θ1, that is, momentary changes in the attitude of vehicle 4 is outputted to control system 20, the threshold used by second sensor 32 also changes in line with the momentary changes in the attitude of vehicle 4. This can affect the capability of obstacle detection.

In view of this, attitude estimation system 10 in Variation 4 solves the foregoing problem on the assumption that a speed sensor (e.g., acceleration sensor) for detecting the speed of vehicle 4 is attached. Stated differently, obtainer 11 further obtains the detection result of the speed sensor that detects the speed of vehicle 4. Also, estimator 12 determines whether a change in the speed of vehicle 4 obtained by obtainer 11 exceeds a predetermined range, thereby determining whether vehicle 4 is rapidly accelerating or deaccelerating. When the change in the speed of vehicle 4 exceeds the predetermined range, that is, when estimator 12 determines that vehicle 4 is rapidly accelerating or deaccelerating, estimator 12 does not estimate relative angle θ1, that is, estimator 12 does not estimate a constant deviation of the attitude of vehicle 4 with respect to the reference attitude.

Variation 4 provides the advantage of easily preventing decrease in the accuracy of estimating a constant deviation of the attitude of vehicle 4 with respect to the reference attitude when, for example, vehicle 4 is rapidly deaccelerating or rapidly accelerating. In particular, as with Variation 1 through Variation 3, Variation 4 does not subject the threshold used by second sensor 32 to change in line with momentary changes in the attitude of vehicle 4. This less affects the capability of obstacle detection.

<Variation 5>

Figure 14:
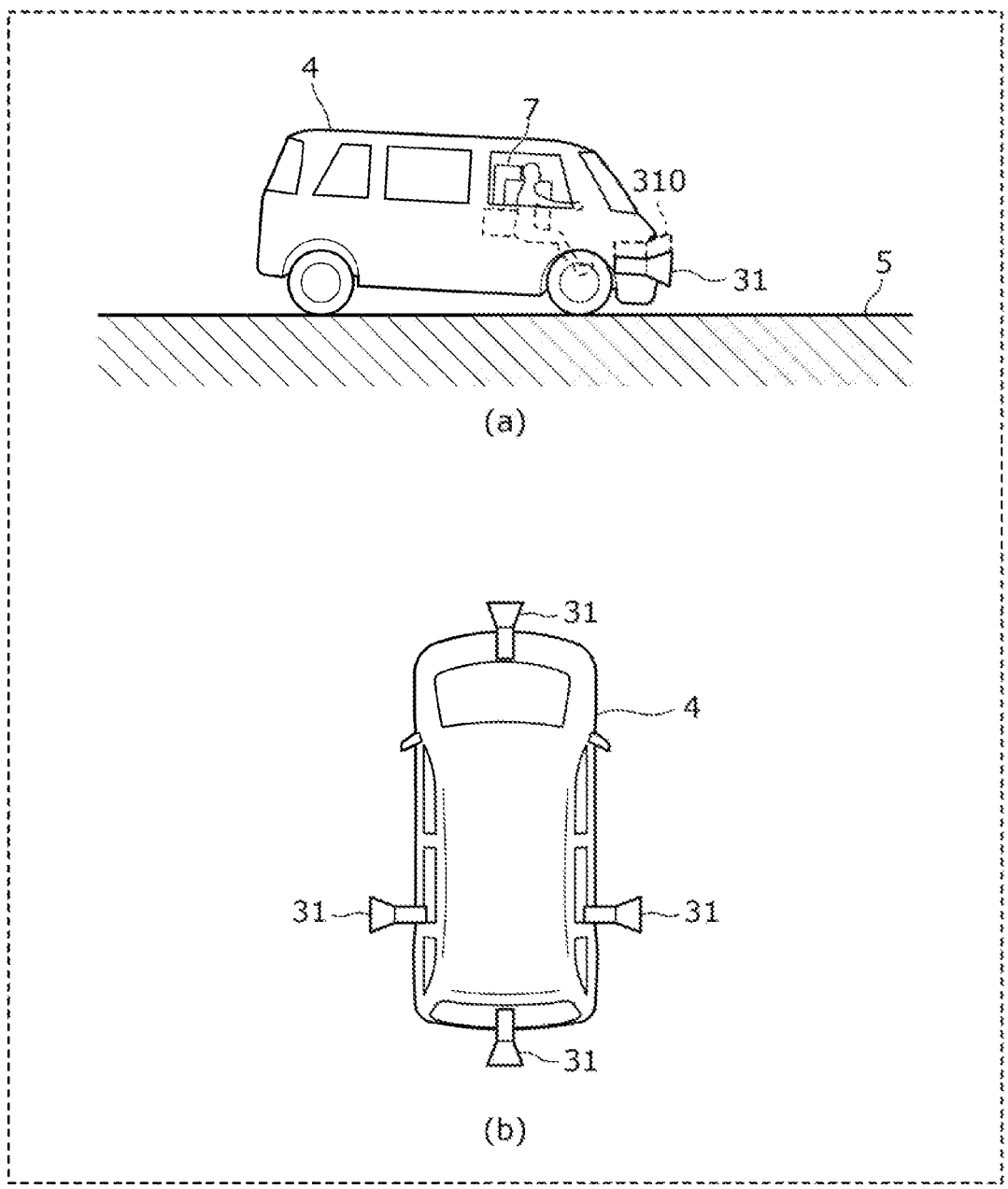
FIG. 14 is a diagram for explaining an attitude estimation system in Variation 5 of the embodiment.

FIG. 14 is a diagram for explaining attitude estimation system in Variation 5 of the embodiment. (a) in FIG. 14 shows first sensor 31 attached to vehicle 4, at the time of attachment, at a position that deviates from predetermined position 310. (b) in FIG. 14 is a plan view showing vehicle 4 viewed from the above and showing first sensors 31 attached to front, rear, left, and right portions of vehicle 4.

As shown in (a) in FIG. 14, first sensor 31 can be attached to vehicle 4, at the time of attachment, at a position that deviates from predetermined position 310. When estimator 12 refers to predetermined position 310 of first sensor 31 in such a case, first sensor 31 deviates from the attachment position at which first sensor 31 should be actually attached. This can decrease the accuracy of calculating relative angle θ1 and the accuracy of estimating a constant deviation of the attitude of vehicle 4 with respect to the reference attitude.

In view of this, attitude estimation system 10 in Variation 5 solves the foregoing problem on the assumption that first sensor 31 is attached to each of the front, rear, left, and right portions of vehicle 4 as shown in (b) in FIG. 14, that is, a plurality of first sensors 31 are attached to vehicle 4 to face mutually different directions. Stated differently, estimator 12 calculates relative angle θ1 on the basis of a plurality of point clouds 60 detected by the respective first sensors 31.

More specifically, estimator 12 does not project point cloud 60 detected by a single first sensor 31 on a plane viewed from the width direction of vehicle 4, but all point clouds 60 detected by all of first sensors 31 on a plane viewed from the width direction of vehicle 4 to calculate line L1 from these point clouds 60. Subsequently, estimator 12 calculates relative angle θ1 from the inclination of line L1 calculated.

In Variation 5, relative angle θ1 is calculated using point clouds 60 detected by the respective first sensors 31. This less affects the result of calculating relative angle θ1 even when any one of first sensors 31 is attached at a position that deviates from predetermined position 310. Stated differently, Variation 5 enables comprehensive calculation of relative angle θ1, using the detection results of a plurality of first sensors 31, even when first sensor 31 is accidentally misaligned such as in the case where first sensor 31 is attached, at the time of attachment, at a position that deviates from predetermined position 310. Variation 5 thus provides the advantage of enabling the accuracy of estimating a constant deviation of the attitude of vehicle 4 with respect to the reference attitude to be less subjected to decrease and easily increasing robustness.

<Variation 6>

Figure 15:
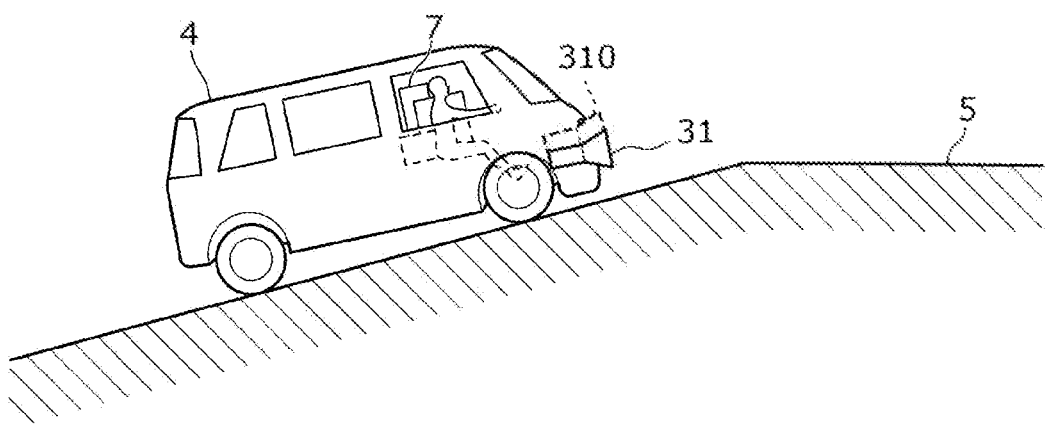
FIG. 15 is a diagram for explaining an attitude estimation system in Variation 6 of the embodiment.

FIG. 15 is a diagram for explaining attitude estimation system in Variation 6 of the embodiment. FIG. 15 shows vehicle 4 in which freight 7 is present is entering a flat road from an upward inclination. As shown in FIG. 15, when vehicle 4 enters a flat road from an upward inclination, the detection region of first sensor 31 is a space above road surface 5. For this reason, the region of road surface 5 to be subjected to the detection by first sensor 31 becomes narrower. This can reduce the number of road surface points 61 that are detected by first sensor 31 and included in point cloud 60 that represents road surface 5, and thus decrease the accuracy of calculating relative angle θ1 and the accuracy of estimating a constant deviation of the attitude of vehicle 4 with respect to the reference attitude.

In view of this, estimator 12 of attitude estimation system 10 in Variation 6 determines whether the number of road surface points 61 included in point cloud 60 representing road surface 5 that is a target object detected by first sensor 31 is smaller than a predetermined number. When the number of road surface points 61 is smaller than the predetermined number, estimator 12 does not estimate relative angle θ1, that is, estimator 12 does not estimate a constant deviation of the attitude of vehicle 4 with respect to the reference attitude.

With Variation 6, the foregoing deviation is estimated only when the number of road surface points 61 included in point cloud 60 representing road surface 5 reaches the number that is enough to calculate relative angle θ1, and the foregoing deviation is not estimated when the number of road surface points 61 is smaller than the number that is enough to calculate relative angle EU. For this reason, Variation 6 provides the advantage of easily preventing decrease in the accuracy of estimating a constant deviation of the attitude of vehicle 4 with respect to the reference attitude when, for example, vehicle 4 enters a flat road from an upward inclination.

<Other Variations>

In the embodiment, first sensor 31 and second sensor 32 are attached to vehicle 4 so that the detection regions thereof are in a forward direction of vehicle 4, but the present disclosure is not limited to this. For example, first sensor 31 and second sensor 32 may be attached to vehicle 4 so that the detection regions thereof are in a rearward direction of vehicle 4 or in a leftward or rightward direction of vehicle 4. First sensor 31 and second sensor 32, when attached to vehicle 4 so that the detection regions thereof are in a leftward or rightward direction of vehicle 4, are capable of estimating a constant deviation of the attitude of vehicle 4 in a roll direction caused by the presence of freight 7. Stated differently, first sensor 31 and second sensor 32 are simply required to be attached to vehicle 4 so that the detection regions thereof are in at least one of the four directions of vehicle 4, that is, forward, rearward, leftward, and rightward. Of course, a plurality of first sensors 31 and a plurality of second sensors 32 may be attached to vehicle 4 so that the detection regions thereof are in a plurality of directions.

In the embodiment, estimator 12 may further refer to a detection result of an attitude sensor, such as a gyroscope sensor, that detects the attitude of vehicle 4 by detecting an angular rate of vehicle 4. In this case, the detection result of the attitude sensor is an absolute angle of vehicle 4 with respect to a flat road serving as a reference plane. Estimator 12 may then further refer to the absolute angle of vehicle 4 with respect to the reference plane, thereby dynamically controlling or adjusting the function of categorizing point clouds 60 detected by first sensor 31 into a point cloud representing road surface 5 or a point cloud representing other than road surface 5. This aspect is expected to increase the accuracy of estimating a constant deviation of the attitude of vehicle 4 with respect to the reference attitude.

Also, estimator 12 may identify a situation in which a momentary deviation in the attitude of vehicle 4 occurs, on the basis of the detection result of the attitude sensor, and may not estimate a constant deviation of the attitude of vehicle 4 with respect to the reference attitude in the identified situation. By eliminating the effect caused by a momentary deviation in the attitude of vehicle 4, this aspect is expected to increase the accuracy of estimating a constant deviation of the attitude of vehicle 4 with respect to the reference attitude.

In the embodiment, when estimator 12 refers to a point cloud located relatively distant from vehicle 4 among point clouds 60 detected by first sensor 31, the accuracy of estimating a constant deviation of the attitude of vehicle 4 with respect to the reference attitude can decrease. In view of this, estimator 12 may refer to only point clouds located within a predetermined distance range from vehicle 4, among point clouds 60 detected by first sensor 31, for example, and may not refer to a point cloud located more than the predetermined distance away from vehicle 4. This aspect is expected to increase the estimation accuracy because it is possible to eliminate point clouds that can inversely affect the estimation of a constant deviation of the attitude of vehicle 4 with respect to the reference attitude.

In the embodiment, estimator 12 estimates a relative and constant deviation of the attitude of vehicle 4 with respect to road surface 5, but the present disclosure is not limited to this. If an inclination of road surface 5 is obtainable, using map information from a position measurement system such as a global positioning system (GPS), for example, it is possible for estimator 12 to also estimate an absolute and constant deviation of the attitude of vehicle 4 with respect to the reference plane by adding such inclination to relative angle θ1.

In the embodiment, first sensor 31 is a sensor, such as a camera and a LiDAR, that detects a target object in the vicinity of vehicle 4, but the present disclosure is not limited to this. First sensor 31 may thus be, for example, an attitude sensor, such as a gyroscope sensor, that detects the attitude of vehicle 4 by detecting an angular rate of vehicle 4. In this case, the detection result of first sensor 31 is an absolute angle of vehicle 4 with respect to a flat road serving as a reference plane. For this reason, estimator 12 is capable of calculating relative angle θ1 by, for example, subtracting the inclination of road surface 5 from the detection result of first sensor 31. The inclination of road surface 5 is obtainable from position measurement information or map information obtained from a position measurement system such as a GPS.

In the embodiment, attitude estimation system 10 may be implemented by a single ECU or the functions of attitude estimation system 10 may be implemented by a plurality of ECUs in a distributed manner. Similarly, control system 20 may be implemented by a single ECU or the functions of control system 20 may be implemented by a plurality of ECUs in a distributed manner.

In the embodiment, attitude estimation system 10 and control system 20 are mutually independent systems, but the present disclosure is not limited to this configuration. For example, attitude estimation system 10 may be configured to include control system 20. In this case, attitude estimation system 10 is simply required to further include controller 22. Also in this case, outputter 13 may output the attitude information to controller 22 instead of outputting the attitude information to input receiver 21.

The order of executing the processing steps in the foregoing attitude estimation system 10 is not necessarily limited to the exact order described above, and thus the order of executing the processing steps may be reordered or partially omitted without departing from the essence of the present invention. Also, part or all of the processing steps may be implemented by hardware or software. Note that such processing, when implemented by software, is realized by a processor included in, for example, a computer executing a control program for such processing stored in a memory. Also, such control program may be recorded in a recording medium and distributed. For example, such distributed control program is installed in a device that includes a processor and executed by such processor in the device, thereby making it possible to cause the device to perform part or all of the foregoing processing.

Although this is not essential, the computer in attitude estimation system 10 may include: an input device such as a touch pad; an output device such as a display and a speaker; a storage device such as a hard disk device and a solid state drive (SSD); a reading device that reads information from a recording medium such as a digital versatile disk read only memory (DVD-ROM) and a universal serial bus (USB) memory; or a transmission and reception device that performs communications via a network. When the foregoing control program is recorded in the recording medium such as a USB memory, for example, the reading device reads such control program and causes the memory or other storage device to record the control program. Alternatively, the transmission and reception device may communicate with an external server device that stores the control program to download the control program from such server device and cause the memory or other storage device to store the control program. Note that attitude estimation system 10 may be configured as an integrated circuit.

Also note that the scope of the present disclosure may also include an embodiment achieved by freely combining each of the foregoing elements and functions.

Further Information about Technical Background to this Application

The disclosure of the following patent application including specification, drawings, and claims are incorporated herein by reference in their entirety: The present application is based on and claims priority of Japanese Patent Application No. 2022-019861 filed on Feb. 10, 2022.

INDUSTRIAL APPLICABILITY

The present disclosure is applicable to, for example, a system that estimates the attitude of a vehicle.

The invention claimed is:
1. An attitude estimation system, comprising:
a first sensor attached to a vehicle and provided for calculating a relative angle, with respect to the first sensor, of a road surface on which the vehicle travels;
a second sensor configured to detect whether an obstacle is present in a vicinity of the vehicle, the second sensor being different from the first sensor;
a processor; and
a memory including a control program that, when executed by the processor, causes the processor to perform functions, the functions including:
obtaining a detection result of the first sensor attached to the vehicle;

calculating the relative angle of the road surface with respect to the first sensor, based on the detection result of the first sensor, and estimating a deviation of the vehicle, the deviation being a constant deviation of an attitude of the vehicle with respect to a reference attitude of the vehicle; and outputting a control signal to the second sensor, that detects whether the obstacle is present in the vicinity of the vehicle, the control signal indicating a threshold used by the second sensor to determine whether the obstacle is present in the vicinity of the vehicle, wherein the processor changes the threshold in accordance with a magnitude of the deviation estimated by the processor.

2. The attitude estimation system according to claim 1, wherein the reference attitude is based on an angle of the vehicle relative to the road surface.

3. The attitude estimation system according to claim 1, wherein the first sensor detects a target object in the vicinity of the vehicle, and the processor calculates the relative angle, based on a point cloud representing the road surface that is the target object detected by the first sensor.

4. The attitude estimation system according to claim 3, wherein the first sensor comprises a plurality of first sensors that are attached to the vehicle to face mutually different directions, and the processor calculates the relative angle, based on a plurality of point clouds detected by the plurality of first sensors, the plurality of point clouds each being the point cloud.

5. The attitude estimation system according to claim 1, wherein, when a variance in the relative angle within a fixed time period exceeds a predetermined value, the processor does not estimate the deviation or estimates the deviation, using an average angle of the relative angle within the fixed time period.

6. The attitude estimation system according to claim 1, wherein the first sensor comprises at least one pair of first sensors, one of the pair of first sensors being attached to a front portion of the vehicle, a remaining one of the pair of first sensors being attached to a rear portion of the vehicle, and the processor determines whether the vehicle is entering an inclination, based on a first relative angle that is based on a first detection result of the one of the pair of first sensors and a second relative angle that is based on a second detection result of the remaining one of the pair of first sensors, and does not estimate the deviation when the processor determines that the vehicle is entering the inclination.

7. The attitude estimation system according to claim 1, wherein the processor does not estimate the deviation when the relative angle includes a momentary rise or fall.

8. The attitude estimation system according to claim 1, wherein the processor further obtains a second detection result of a speed sensor that detects a speed of the vehicle, and the processor does not estimate the deviation when a change in the speed of the vehicle exceeds a predetermined range.

9. The attitude estimation system according to claim 1, wherein the first sensor detects a target object in the vicinity of the vehicle, and the processor does not estimate the deviation when a total number of road surface points is below a predetermined number, the road surface points being included in a point cloud representing the road surface that is the target object detected by the first sensor.

10. A control system, comprising:

a receiver that obtains attitude information indicating a deviation of a vehicle, the deviation being a constant deviation of an attitude of the vehicle with respect to a reference attitude of the vehicle, the deviation of the vehicle being estimated based on a relative angle of a road surface on which the vehicle travels, the relative angle of the road surface being calculated with respect to a first sensor and based on a detection result of the first sensor, the first sensor being attached to the vehicle and provided for calculating the relative angle of the road surface on which the vehicle travels; and a processor that outputs a control signal to a second sensor, that detects whether an obstacle is present in a vicinity of the vehicle, based on the attitude information obtained by the receiver, the control signal indicating a threshold used by the second sensor to determine whether the obstacle is present in the vicinity of the vehicle, the second sensor being different from the first sensor, wherein the processor changes the threshold in accordance with a magnitude of the deviation indicated by the attitude information.

11. An attitude estimation method, comprising:

obtaining a detection result of a first sensor, the first sensor being attached to a vehicle and provided for calculating a relative angle, with respect to the first sensor, of a road surface on which the vehicle travels;

calculating, by a processor, the relative angle of the road surface with respect to the first sensor, based on the detection result of the first sensor;

estimating, by the processor, a deviation of the vehicle, the deviation being a constant deviation of an attitude of the vehicle with respect to a reference attitude of the vehicle; and outputting a control signal to a second sensor, that detects whether an obstacle is present in a vicinity of the vehicle, the control signal indicating a threshold used by the second sensor to determine whether the obstacle is present in the vicinity of the vehicle, the second sensor being different from the first sensor, wherein the processor changes the threshold in accordance with a magnitude of the deviation estimated by the processor.

12. The attitude estimation system according to claim 1, wherein the first sensor is a camera.

13. The attitude estimation system according to claim 12, wherein the second sensor detects whether the obstacle is present in the vicinity of the vehicle by receiving waves reflected from the obstacle.

14. The attitude estimation system according to claim 1, wherein the second sensor detects whether the obstacle is present in the vicinity of the vehicle by receiving waves reflected from the obstacle.

* * * * *